United States Patent
Anand et al.

(10) Patent No.: US 11,818,596 B2
(45) Date of Patent: *Nov. 14, 2023

(54) LINK FAULT HANDLING IN FRONTHAUL COMMUNICATION NETWORKS

(71) Applicant: Cisco Technology, Inc., San Jose, CA (US)

(72) Inventors: Prashant Anand, Bangalore (IN); Manoj Kumar, Bangalore (IN); Sudhir Kayamkulangara, Bangalore (IN); Manigandan Boopalan, Bangalore (IN); Dinuraj K, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/527,642

(22) Filed: Nov. 16, 2021

(65) Prior Publication Data

US 2022/0078642 A1    Mar. 10, 2022

Related U.S. Application Data

(63) Continuation of application No. 16/543,344, filed on Aug. 16, 2019, now Pat. No. 11,206,557.

(51) Int. Cl.
| | | |
|---|---|---|
| *H04W 24/04* | (2009.01) | |
| *H04L 41/0677* | (2022.01) | |
| *H04L 41/0654* | (2022.01) | |
| *H04L 41/069* | (2022.01) | |
| *H04W 84/20* | (2009.01) | |

(52) U.S. Cl.
CPC .......... *H04W 24/04* (2013.01); *H04L 41/069* (2013.01); *H04L 41/0654* (2013.01); *H04L 41/0677* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 2012/0250738 A1 | 10/2012 | Shako | |
| 2013/0100948 A1* | 4/2013 | Irvine | H04W 88/085 370/350 |

(Continued)

OTHER PUBLICATIONS

"Common Public Radio Interface (CPRI) Interface Specification", CPRI Specification V7.0, Oct. 9, 2015, 128 pages.

(Continued)

*Primary Examiner* — Jenkey Van
(74) *Attorney, Agent, or Firm* — Lee & Hayes, P.C.

(57) ABSTRACT

In a fronthaul network system, when a CPRI link fault is detected at either of the REC or RE, both the REC and RE perform a Layer 1 synchronization. The fault may be a loss of signal, loss of frame, or a line code violation, which also translates to a loss of signal if seen beyond a threshold. A proxy slave recognizes the fault in a CPRI signal from a first radio device and inserts the fault alarm into a header of a radio over Ethernet frame. The proxy slave continues to communicate the signal for a configured number of hyper-frames. A proxy master receives the signal and communicates the signal and the fault alarm to a receiving radio device for a configured number of hyper-frames. The proxy and radio devices all perform a joint resynchronization.

20 Claims, 8 Drawing Sheets

(56) References Cited

U.S. PATENT DOCUMENTS

| | | | |
|---|---|---|---|
| 2014/0185601 | A1 | 7/2014 | Ilyadis |
| 2015/0249549 | A1 | 9/2015 | Martinotti |
| 2015/0288445 | A1 | 10/2015 | Lins De Medeiros |
| 2017/0063491 | A1* | 3/2017 | Bruckman .......... H04L 25/4908 |
| 2017/0070983 | A1 | 3/2017 | Cheng |
| 2018/0206203 | A1 | 7/2018 | Ruffini |
| 2021/0051494 | A1 | 2/2021 | Anand |

OTHER PUBLICATIONS

"Office Action cited in U.S. Appl. No. 16/543,344, filed Aug. 16, 2019", dated May 12, 2021, 20 pages.

Checko, et al., "Synchronization challenges in packet-based Cloud-RAN fronthaul for mobile networks", 2015 IEEE International Conference on Communication Workshop (ICCW), 2015, pp. 2721-2726, doi: 10.1109/ICCW.2015.7247590. (Year: 2015), 6 pages.

Chitimalla, et al., "5G fronthaul-latency and jitter studies of CPRI over ethernet", IEEE/OSA Journal of Optical Communications and Networking, vol. 9, No. 2, pp. 172-182, Feb. 2017, doi: 10.1364/JOCN.9.000172. (Year: 2017), 10 pages.

Korhonen, "IEEE P1904.3 Radio over Ethernet short introduction", IEEE 802.1TSN, Macau 2016 (Year: 2016).

Maiden, "IEEE P1904.3 TF Radio over Ethernet update", IEEE 802.1TSN, Budapest 2016 (Year: 2016), 10 pages.

\* cited by examiner

LINK FAULT HANDLING IN FRONTHAUL COMMUNICATION NETWORKS

CROSS REFERENCE TO RELATED APPLICATIONS

This application is a continuation of and claims priority to U.S. patent application Ser. No. 16/543,344, filed on Aug. 16, 2019, and entitled "Link Fault Handling In Fronthaul Communication Networks. The complete disclosure of the above-identified priority application is hereby fully incorporated herein by reference.

TECHNICAL FIELD

This disclosure relates link fault handling in fronthaul communication networks, and, more particularly, to handling loss of signal ("LOS"), loss of frame ("LOF"), and line code violation ("LCV") faults in fronthaul communications networks.

BACKGROUND

In conventional technologies utilizing common public radio interface ("CPRI") or similar communication network technologies, radio base station devices, such as baseband units (REC), radio equipment devices (RE) or remote radio heads (RRH), communicate data with one another. FIG. 1 is a diagram depicting a conventional CPRI network 100 without fronthaul. As shown, the conventional CPRI network 100 includes a remote equipment control CPRI device ("REC") 110 and a radio equipment ("RE") CPRI device 150.

As depicted in the diagram, a CPRI link is utilized between the REC 110 and RE 150. In deployments of co-located REC 110 and RE 150, the CPRI link is used as directly connected bi-directional point-to-point topology over fiber. The master port (REC 110) drives the slave port (RE 150) for operations such as link initiation, Layer 2 protocol setup, control and management ("C&M") plane setup, and other suitable operations. CPRI provides a point-to-point bit synchronous serial data link between the REC 110 and the RE 150, which provides an "always ON constant bit rate" steady data stream. A CPRI signal is a duty free always ON bit-stream, which has defined framing structures and contains control information at specific word positions (first word in every basic frame).

The REC 110 and RE 150 are examples of two basic building blocks of a radio base station. The REC 110 is a computing device directed to network interface transport, radio base station control and management, and digital baseband processing. The RE 150 is a computing device directed to providing analog and radio frequency functions, such as filtering, modulation, frequency conversion, and amplification. The RE 150 serves as the air interface to user equipment.

Conventional CPRI technology defines a standard framing structure and contains control information in the first control word of every basic frame. The CPRI v7.0 specification defines a standard procedure to detect link faults, such as loss of frame ("LOF") and loss of signal ("LOS"). The CPRI v7.0 specification describes the procedure to handle these link faults via the CPRI state machine, the various states, and transitions between those states. The CPRI v7.0 specification also describes threshold values, methods of detecting and clearing faults due to line code violations in case of 8/10B line encoding, and methods of detecting and clearing sync header violations in case of 64/66B line encoding.

On detecting a LOS/LOF fault in the received CPRI bit stream, the detecting node (REC or RE) first uses a particular control word Z.130.0 to inform the far-end equipment (RE/REC) of the occurrence of the fault. Then, both the local and the far end (REC/RE) transition to a Layer 1 synchronization state to restart the link negotiation per the procedure described in the CPRI v7.0 specification. As part of this transition, to achieve CPRI Layer 1 synchronization, the REC 110 and RE 150 carry out the following operations: 1) the REC 110 starts transmitting a rate for an interval T1 (0.9 to 1.1 seconds) and then moving to a next configured rate after every such T1 interval, 2) the RE 150 attempts to receive a rate for Interval T2 (3.9 to 4.1 seconds) and then moves to a next configured rate, and 3) steps 1) and 2) are repeated until a common match is achieved and the RE 150 can attain HFNSYNC from the REC 110 transmitted stream, following which, the RE 150 also starts transmitting towards the REC 110 using the same link rate. Subsequently, the REC 110 attains the same from the RE 150 transmitted CPRI stream.

Using different transmit rates at REC 110 and different receive rates at RE 150 for different transmit T1 and receive T2 intervals allows the two devices to arrive at a common matching rate and to achieve byte, frame, and phase synchronization between the REC 110 and RE 150. This process to achieve a common match is likely to complete when both REC 110 and RE 150 have maximum link rates configured.

In the conventional technology, the REC 110 and the RE 150 communicate faults to each other via CPRI to alert the devices 110, 150 of a need to resynchronize. The REC 110 and RE 150 detect link faults as per the received CPRI stream. If a fault is detected, it is reported to the far end as well as per detailed procedures specified in the CPRI v7.0 specifications. In direct point to point CPRI link deployments, the CPRI v7.0 specification describes the procedure for detecting, communicating with the other end, and handling these link faults as the CPRI state machine transitions to re-establish the link.

DETAILED DESCRIPTION

Overview

Figure 1:
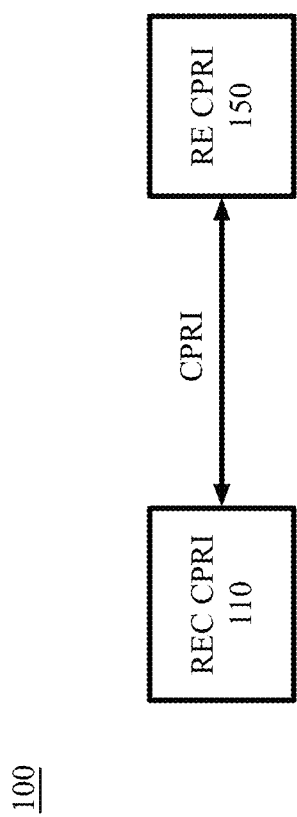
FIG. 1 is a diagram depicting a conventional CPRI network without fronthaul.

In a conventional CPRI system, when a CPRI link fault is detected at either of the radio device endpoints, such as an REC or an RE, both the REC and RE initiate a Layer 1 synchronization after sharing the fault to each other using a Z.130.0 control byte, as defined in the CPRI specifications. The REC and RE may attempt different rates than the earlier working rate during the Layer 1 synchronization process.

In unified ethernet based 5G fronthaul systems, the REC and RE do not interact directly. Rather proxy ethernet nodes capable of CPRI frame mapping/de-mapping interface with the REC and RE. The proxy ethernet node capable of CPRI mapping/de-mapping connected directly to the REC is termed as proxy slave and another such node connected directly to the RE at the far end is termed as proxy master hereafter. In unified ethernet based 5G fronthaul systems, the CPRI communication (continuous domain) is mapped to RoE frames and carried over Ethernet based network (discontinuous domain) using CPRI Gateway nodes (proxy slave and slave).

The REC and RE devices use CPRI for transmitting or receiving to or from each other. In between these nodes, the proxy nodes receive CPRI from the REC/RE and map it to RoE frames as per IEEE 1914.3 specification and send towards the other proxy end, which further plays out CPRI towards the RE/REC. IEEE 1914.1 and 1914.3 (referred to herein as "IEEE 1914 standards") provide standards for encapsulation and mapping/de-mapping of radio data, such as CPRI bit streams, and/or potential control and/or management packets within Ethernet frames. The IEEE 1914 standards define different RoE mappers/de-mappers, including: structure-aware, structure-agnostic, and native mode in which structure-aware mapping/de-mapping operations can be used for CPRI data, structure-agnostic mapping/de-mapping operations can be used for any digitized radio data, and native mode mapping/de-mapping operations can be used for digitized radio In-phase/Quadrature (I/Q) payload data.

For example, the REC communicates via CPRI to a proxy slave device, which communicates via an Ethernet network to a CPRI device. The proxy master communicates via CPRI to the far end CPRI end point device RE. In the REC initiated transmission towards the RE, the proxy master maps the CPRI stream to RoE frames and transmits the data towards the proxy slave using the ethernet network. In the opposite direction of RE initiated transmission towards the REC, the proxy slave maps the CPRI stream to RoE frames and transmits the data towards the proxy master using the ethernet network.

Details of this configuration are described in greater detail below with respect to FIG. 2 herein.

In unified ethernet based fronthaul systems, in an operational state, all REC, RE, and proxy nodes use a single rate for transmitting CPRI bit streams. In the unified ethernet based fronthaul systems, similar to the operations of CPRI based co-located REC and RE deployments, link faults are detected in the received CPRI stream by either or both of the REC and RE, and the REC/RE communicate the local fault to the far end of the network using the Z.130.0 CPRI control word. Additionally, both the RE/REC transition to the Layer 1 synchronization state on detecting the link fault locally or on receiving link fault alarm from the peer end to restart the link negotiation.

The REC/RE will detect the HFNSYNC failure in the received CPRI stream as per the CPRI v7.0 specification and accordingly send the alarm info in Z.130.0 to the far end. Then the REC/RE transition to Layer 1 synchronization state to re-establish the Layer 1 link. Similarly, a complete loss of signal is detected in the receive direction as per the CPRI specification and thereafter the same procedure is followed. The proxy slave node that is receiving the CPRI stream in the same CPRI flow direction (RE to REC or REC to RE) will also detect the K byte mismatches and the eventual HFNSYNC failure.

At this stage, the proxy nodes do not transition to Layer 1 synchronization immediately; rather they allow the end to end fault communication. The nodes will allow the CPRI stream to go through to the far end in RoE frames and the far end will get the alarm indication so that the fault can be handled at the real CPRI end points.

At this stage, since the REC and RE would have moved to the Layer 1 synchronization state, the REC and RC would change their transmitter/receiver rates as per the auto negotiation procedure. Thus, the proxy rates must also tune their state machine to allow this Layer 1 synchronization to happen between REC and RE. Therefore, two approaches may be used as logic for proxy nodes in this situation.

In the first approach, the proxy node which received the CPRI stream and detected the link fault (HFNSYNC failure or LOS) will also move to Layer 1 synchronization state after 10 hyper-frames of detecting the fault. This delayed switch is needed to allow the end-to-end alarm information propagation to go through to the far end.

In the second approach, when the RE asserts LOS on detection of link fault (as a result of disabling the transmitter during switch to the Layer 1 synchronization state), the proxy slave will use that LOS as a stimulus to transition to the Layer 1 synchronization state.

The proxy node will also inform the far end proxy node counterpart about the link fault by providing an indication using a bit in the header of RoE frames. The far end proxy node will also use this indication as a stimulus to transition to the Layer 1 synchronization state. Thus, all the nodes have the information about the link fault and have moved to the Layer 1 synchronization one after the other. In this state, auto negotiation procedure is used on REC/RE and on the proxy nodes to arrive at a single common match at all nodes and complete Layer 1 synchronization, which can be followed by higher layer negotiations.

When the REC/RE initiate Layer 1 synchronization, the REC and RE may attempt different rates than the earlier working rate during the Layer 1 synchronization process. Thus, the REC, RE, and the proxy nodes may be using different rates at this stage, which breaks the end to end communication and this may continue indefinitely until all of these nodes initiate the Layer 1 synchronization at the same time and converge at a single rate at all the CPRI interfacing points.

In an Ethernet based fronthaul system, the Ethernet based CPRI gateway nodes or the proxy nodes are mapping and demapping the CPRI streams transmitted by the REC and RE to and from RoE frames respectively towards the other end of the fronthaul system. When a CPRI link fault is detected at the REC and/or RE, these nodes will initiate the Layer 1 synchronization after sharing the fault to each other using a Z.130.0 control byte, as defined in the CPRI specifications.

The REC, RE, and the proxy nodes may be using different rates at this stage, which impedes the end to end CPRI communication. The communication mismatch may continue until all the nodes begin a Layer 1 synchronization at the same time and eventually converge again at a single rate at all the CPRI interfacing points. With a stimulus for the proxy nodes to make a transition to the Layer 1 synchronization at substantially the same time that the REC/RE transitioned to the Layer 1 synchronization state, a more efficient and faster resynchronization will result.

In an operational state, the proxy nodes act as passive nodes to allow the end-to-end CPRI data to flow. The proxy nodes may remain transparent to the vendor specific implementation/handlings at the CPRI end points. However, when a fault occurs at the REC or RE points, the REC/RE initiate Layer 1 synchronization after sharing the fault to each other using Z.130.0 control byte, the REC and RE may attempt different rates than the earlier working rate during the Layer 1 synchronization process. When a loss of signal ("LOS") or a loss of frame ("LOF") fault occurs, the REC or the RE will detect the fault. The LOF is detected using the first control word (sync byte) as per the procedure specified by the CPRI v7.0 specification. The fault is then communicated using a Z.130 control word.

In a continuing example, the fault occurs at the REC and is communicated through the proxy nodes to the RE, but in practice, the process could flow from any radio device endpoint to any other radio device endpoint, such as the RE to REC. The proxy slave node that is receiving the CPRI stream from the REC will receive the link fault or recognize a notice of the fault. The proxy slave does not take any immediate action to resynchronize upon detecting the fault. The proxy slave continues transmitting for a configured number of frames, such as ten hyper-frames, to allow the CPRI stream to go through to the far end in RoE frames. The far end will receive the alarm indication so that the fault can be handled at the real CPRI end points. The proxy master performs similar functions if the fault occurs at the RE. The proxy nodes continue transmitting for a configured number of frames, such as ten hyper-frames.

Upon recognizing the fault, the REC and RE move to the Layer 1 synchronization state. The REC and RE will change their transmitter/receiver rates by following an auto negotiation procedure (described in greater detail with respect to block 320 of FIG. 3 herein). The proxy node rates also must begin the Layer 1 synchronization if the entire network chain is to be resynchronized.

In the continuing example, the proxy slave that received the CPRI stream from the REC with the link fault notification will also move to Layer 1 synchronization state after the configured 10 hyper-frames following the fault. This delayed transition allows the end-to-end fault alarm information propagation to be communicated through to the far end. The proxy node, such as the proxy slave, will inform the far end proxy node counterpart, such as the proxy master, about the fault via a bit in the header of RoE frames carrying the CPRI stream mapped into RoE frame by following procedures specified in IEEE 1914.3. The receiving proxy node reads the fault indication and utilizes the indication as a stimulus to transition to the Layer 1 synchronization state after a configured number of frames, such as ten hyper-frames.

In an LOS fault, the fault is created when a complete loss of signal is recognized. The fault is then communicated using a Z.130 control word.

In a continuing example, the fault occurs at the REC and is recognized by the proxy node receiving the CPRI stream. The proxy slave node that is no longer receiving the CPRI stream from the REC will detect the fault. The proxy slave node does not take any immediate action to resynchronize upon detecting the fault. The proxy master continues transmitting for a configured number of frames, such as ten hyper-frames, to allow the loss of signal fault to be communicated to the far end in RoE frames. The far end will receive the alarm indication so that the LOS can be handled at the real CPRI end points. The proxy master performs similar functions if the LOS occurs at the RE. The proxy nodes continue transmitting for a configured number of frames, such as ten hyper-frames.

Upon recognizing the LOS, the REC and RE move to the Layer 1 synchronization state. The REC and RE will change their transmitter/receiver rates by following an auto negotiation procedure (described in greater detail with respect to block 320 of FIG. 3 herein). The proxy node rates also must begin the Layer 1 synchronization if the entire network chain is to be resynchronized.

In the continuing example, the proxy slave that received the CPRI stream from the REC and detected the LOS will also move to Layer 1 synchronization state after the configured ten hyper-frames following the fault. This delayed switch allows the end-to-end fault alarm information propagation to be communicated through to the far end. The proxy node, such as the proxy slave, will inform the far end proxy node counterpart, such as the proxy master, about the fault via a bit in the header of RoE frames carrying the CPRI stream mapped into RoE frame by following procedures specified in IEEE 1914.3. The receiving proxy node reads the fault indication and utilizes the indication as a stimulus to transition to the Layer 1 synchronization state after a configured number of frames, such a ten hyper-frames.

In an alternate example, line code violations ("LCV") may occur in systems with CPRI rates using 8/10B line coding, and sync header violations in systems with CPRI rates using 64/66B line coding. In structure agnostic mode without line coding (or line coding aware) mapping, the proxy slave receiving the CPRI stream remove the line coding bits while mapping the stream encoded with 8B/10B or 64B/66B to radio over Ethernet ("RoE") frames. During this decoding, forward error correction and scrambling when supported are undone and the information about any line coding violation in the case of 8/10B encoding and sync header violation in the case of 64/66B encoding is lost on the proxy slave. That is, if the encoded 10-bit symbol or 66 bit block header had a violation, the violation information can no longer be detected from the decoded 8-bits in the case of 8/10B encoding and 64 bits in the case of 64/66B encoding.

When this decoded data with a violation is sent to the other end in RoE frames and is communicated as a CPRI stream towards the real CPRI end point, the line code violation information is lost.

The present technology preserves the LCV information by the employing the following process. A device, such as the proxy slave, receiving the CPRI stream compares the number of line code violations to a configured threshold based on the type of line coding being used. If the number of line code violations is greater than the threshold, the RE or REC considers the LCV to be a complete LOS. The system responds to the LCV by using variable and/or fixed-sized extension headers to communicate the LCV to the proxy master. The receiving proxy node reads the fault indication and utilizes the indication as a stimulus to transition to the Layer 1 synchronization state.

In an alternate example, the experimental RoE subType in the RoE header may be used for communicating the LCV fault information between the proxy nodes.

The IEEE 1914.1 and IEEE 1914.3 specifications are the standards for packet based fronthaul transport networks. However, these standards do not illustrate how the CPRI link faults are communicated across the fronthaul network and handled while remaining compliant with the CPRI specification. The technology described herein proposes methods to solve this problem. A network operator can deploy CPRI based REC and/or RE units of varied capabilities in a fronthaul network, and the methods herein will handle the link faults without impacting any of the CPRI higher layer implementations. When faults occur, the resynchronization will occur faster than in conventional technologies. The faster resynchronization allows the system to begin communicating normally with a shorter delay or downtime for the end users.

These and other aspects, objects, features, and advantages of the examples will become apparent to those having ordinary skill in the art upon consideration of the following detailed description of illustrated examples.

Example System Architecture

Referring to the drawings, in which like numerals represent like (but not necessarily identical) elements throughout the figures, example embodiments are described in detail.

Figure 2:
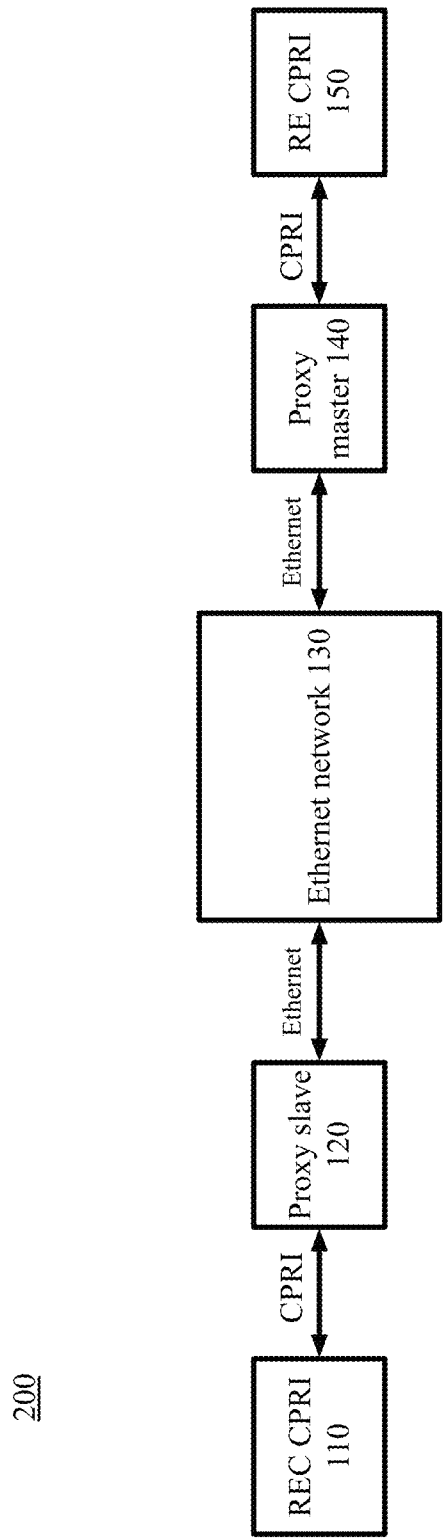
FIG. 2 is a diagram depicting an example fronthaul network, in accordance with certain examples of the technology disclosed herein.

FIG. 2 is a diagram depicting an example computing device 200 illustratively comprising a remote equipment control CPRI primary ("REC") 110, a proxy slave 120, a proxy master 140, and a radio equipment ("RE") CPRI replica 150.

As depicted in the diagram, a signal is communicated from the REC 110 to the proxy slave 120 via CPRI. The signal is mapped to an Ethernet communication technology and communicated over an Ethernet network 130 to the proxy master 140. The signal is subsequently mapped by the proxy master 140 to a CPRI technology and communicated via CPRI to the RE 150. A continuing example used throughout the description herein follows this configuration. In alternative examples, the signal may proceed in the opposite direction from the RE 150 to the REC 110. In other examples, other similar communication technologies or components may perform the methods herein.

The REC 110 and RE 150 are examples of two basic building blocks of a radio base station. The REC 110 is a computing device directed to the network interface transport, the radio base station control and management, as well as the digital baseband processing. The RE 150 is a computing device directed to providing the analog and radio frequency functions such as filtering, modulation, frequency conversion, and amplification. RE 150 serves as the air interface, to user equipment.

The REC 110 and RE 150 communicate via CPRI or other similar communication technologies. In other examples, other devices that communicate via CPRI or other similar communication technologies may utilize the technology herein when deployed in a fronthaul network. Alternatively, as described herein, the technology may be utilized for communications in either direction or with other types of devices. REC 110 and RE 150 are useful examples of computing devices that would employ the technology. The REC 110 and RE 150 may be a conventional computer system, one or more processors associated with a specialized communication system, a customized machine, any other hardware platform, or any combination or multiplicity thereof.

The REC 110 and RE 150 may be comprised of various internal components such as a processor, a memory, a flash memory, one or more input/output ("I/O") ports, and other suitable components.

The proxy master device 140 is an Ethernet enabled device that has unidirectional control over the proxy slave device 120. The proxy devices 120, 140 are computing devices that are configured to map a received CPRI signal from a device, such as the REC 110 or the RE 150, to an Ethernet format and communicate the signal over the Ethernet network 130 to the other proxy device 120, 140. When the downstream proxy device 120, 140 receives the Ethernet signal, the proxy device 120, 140 converts the signal back to a CPRI signal for communication to the endpoint CPRI device, such as the REC 110 or the RE 150. The proxy device 120, 140 may utilize radio over Ethernet ("RoE") to communicate between each other or any other suitable communication technology. The communication between proxy devices 120, 140 over the Ethernet network 130 is typically via fiber optic cable or other suitable available cables. In alternate embodiments, a wireless Ethernet network 130 may be used.

The proxy devices 120, 140 may be comprised of various internal components such as a processor, a memory, a flash memory, one or more input/output ("I/O") ports, and other suitable components.

Example Processes

Figure 3:
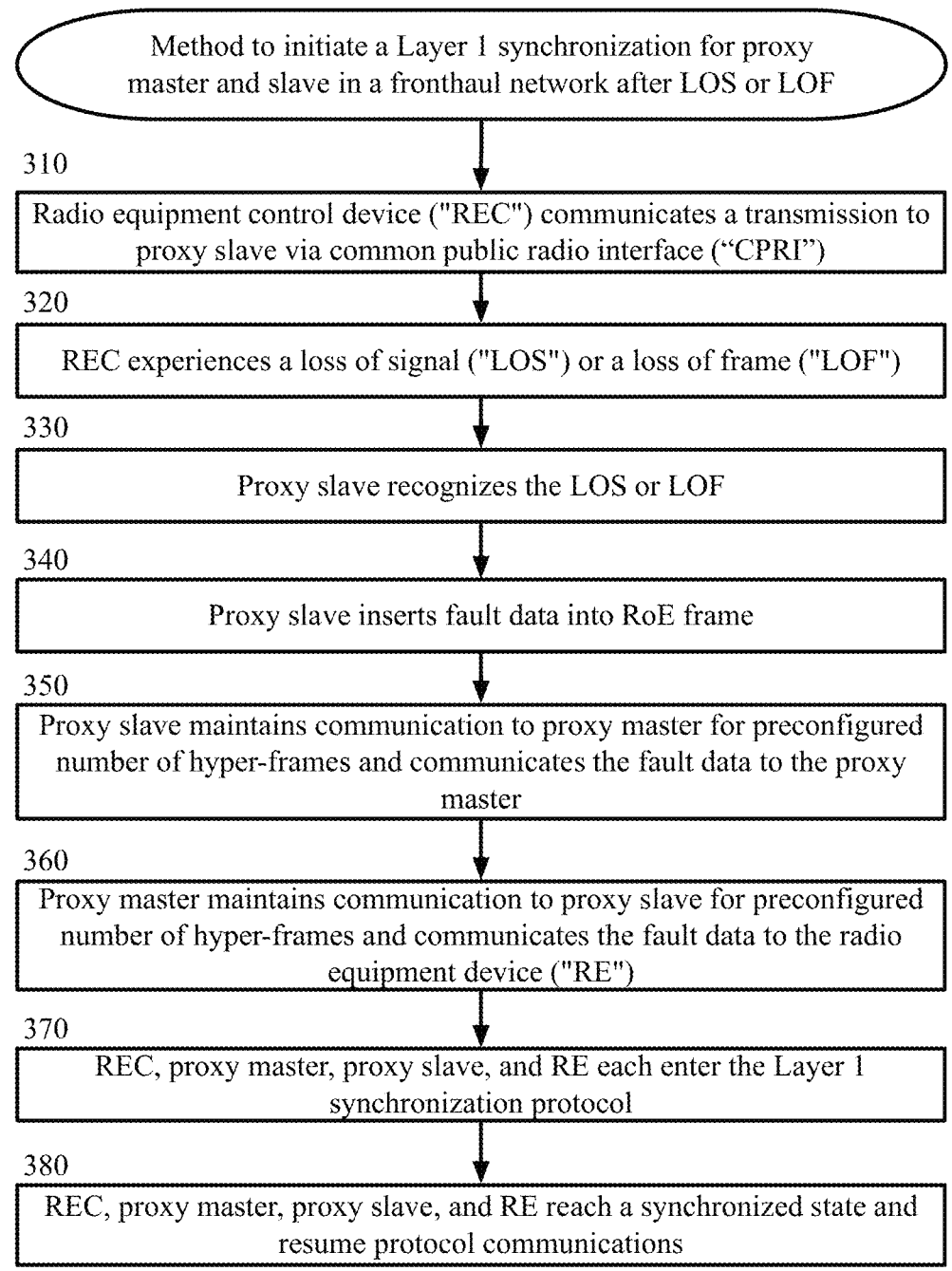
FIG. 3 is a block flow diagram depicting a method to initiate a Layer 1 synchronization for proxy nodes in a fronthaul network after loss of signal or loss of frame, in accordance with certain examples of the technology disclosed herein.
Figure 4:
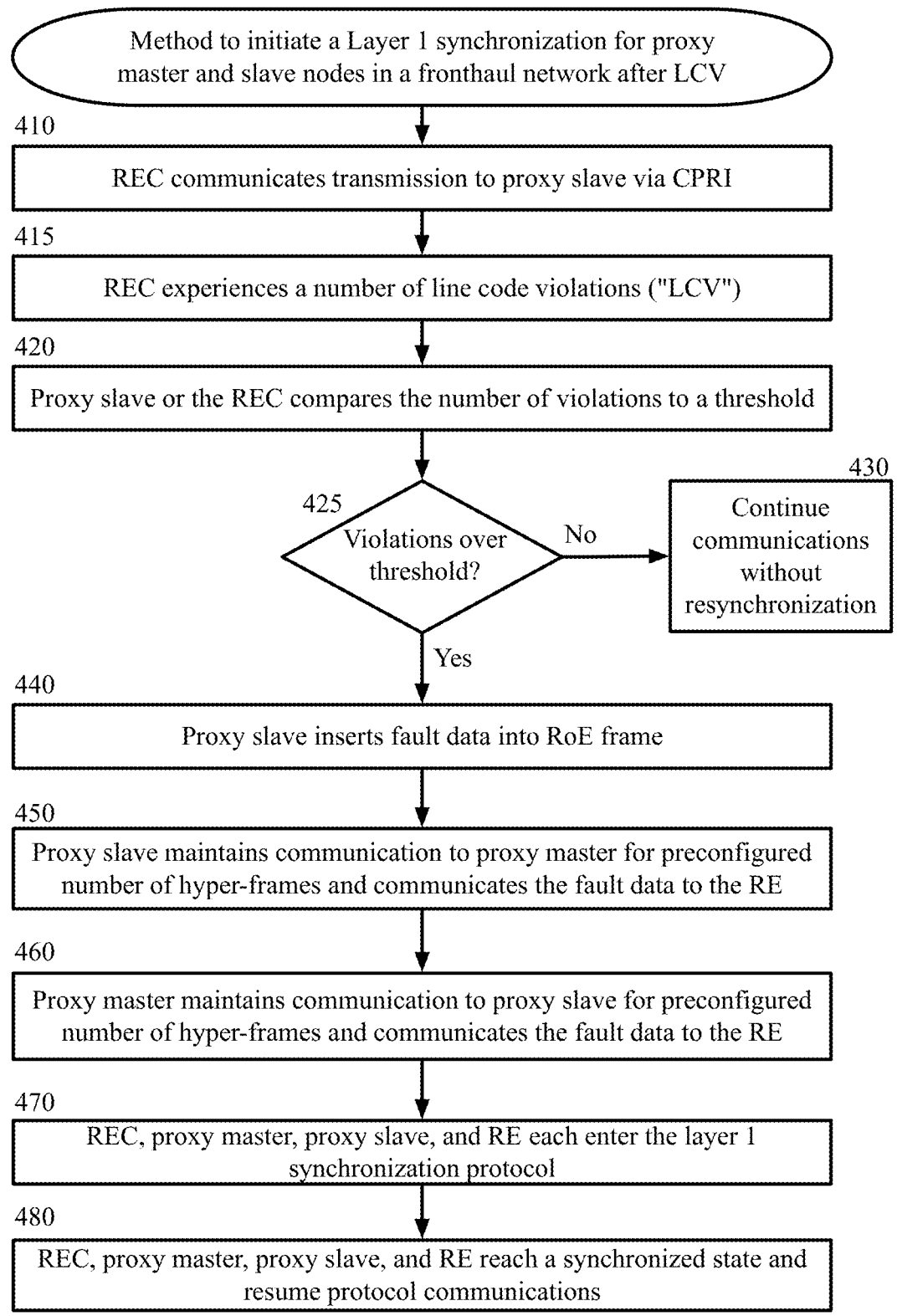
FIG. 4 is a block flow diagram depicting a method to initiate a Layer 1 synchronization for proxy nodes in a fronthaul network after line code violations, in accordance with certain examples of the technology disclosed herein.

The example methods illustrated in FIGS. 3-4 are described hereinafter with respect to the components of the example computing device 200. The example methods of FIGS. 3-4 may also be performed with other systems and in other environments. The operations described with respect to any of the FIGS. 3-4 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

FIG. 3 is a block flow diagram depicting a method 300 to initiate a Layer 1 synchronization for proxy nodes 120, 140 in a fronthaul network after LOS or LOF.

In block 310, the REC 110 communicates a CPRI stream of 8/10B encoded or 64/66B encoded symbols as per the CPRI line rate to proxy slave 120 via CPRI. The signal may include a packet of information or other data. The signal is communicated via an over-the-air signal. The proxy slave 120 receives the signal via an antenna or other receiver of the proxy slave 120. The signal may be a series of packets or information that is communicated continuously or periodically. Alternatively, the signal may be communicated via similar technology or protocol.

In block 320, the REC 110 experiences a loss of signal ("LOS") or a loss of frame ("LOF"). An LOS is an indicator on a device, such as an REC 110, that the signal or connection has been dropped or terminated. Reasons for losing the signal may include faults such as the cable connected to the network device is faulty, improper network configuration, or the REC 110 itself is faulty. The LOF occurs when one or more frames are not received or are not able to be communicated. When frames are missing or misaligned, the LOF fault may be discoverable. Regardless, of the reason, the REC 110 has a fault that is discoverable in the communication to the proxy slave 120.

In a conventional CPRI network that does not utilize fronthaul (as depicted in FIG. 1), on detection of the LOF or LOS, as per the procedure described in CPRI v7.0 specs due to successive K BYTE mismatch detection at the start of hyper-frame, the local end, REC 110, first uses the Z.130.0 to inform the far end equipment, RE 150, of the occurrence of the fault. After that, both the REC 110 and the RE 150 (local as well as remote end) transition to Layer 1 synchronization state to restart the link negotiation again where the REC 110 starts transmitting a rate for 1 second and then moving to next configured rate and so on. Then the RE 150 starts attempting to receive a rate for 4 seconds and then moving to next configured rate and so on. Then, the REC 110 and the RE 150 repeat these steps until a common match is achieved and the RE 150 can attain HFNSYNC from REC 110 transmitted stream followed by REC 110 attaining the same from RE 150 transmitted CPRI stream.

However, the above described available CPRI link fault handling process is not possible with fronthaul deployments (as depicted in FIG. 2). In order for the end-to-end CPRI communication to work, the proxy nodes 120, 140 play a passive role, like a CPRI gateway, and the proxy slave 120 receives the CPRI bitstream from REC 110 and maps it to RoE frames as per IEEE 1914.3 specification for communication downstream. When a CPRI link fault is detected at REC 110 and RE 150 and the REC 110 and RE 150 go for Layer 1 synchronization after sharing the fault to each other using Z.130.0 control byte, the REC 110 and RE 150 may attempt different rates than the earlier working rate during the Layer 1 synchronization process. Therefore, REC 110, RE 150 and the proxy nodes 120, 140 may be using three different rates at this stage, which breaks the end-to-end communication. The break may continue indefinitely until all the nodes start performing the Layer 1 synchronization at the same time and eventually converge again at a single rate at all the CPRI interfacing points. Therefore, a stimulus is needed for the proxy nodes 120, 140 to make a transition to the Layer 1 synchronization (on the same lines as REC/RE 110, 150) around the same time when REC/RE 110, 150 transitioned to the Layer 1 synchronization state.

In block 330, the proxy slave 120 recognizes or receives a notice of the LOS or LOF in the signal from the REC 110. The proxy slave 110 either recognizes the fault in the signal or recognizes an alarm signal or other link fault notice from the REC 110. In a conventional fronthaul system, the proxy slave 110 would stop communicating the faulty signal.

Figure 5:
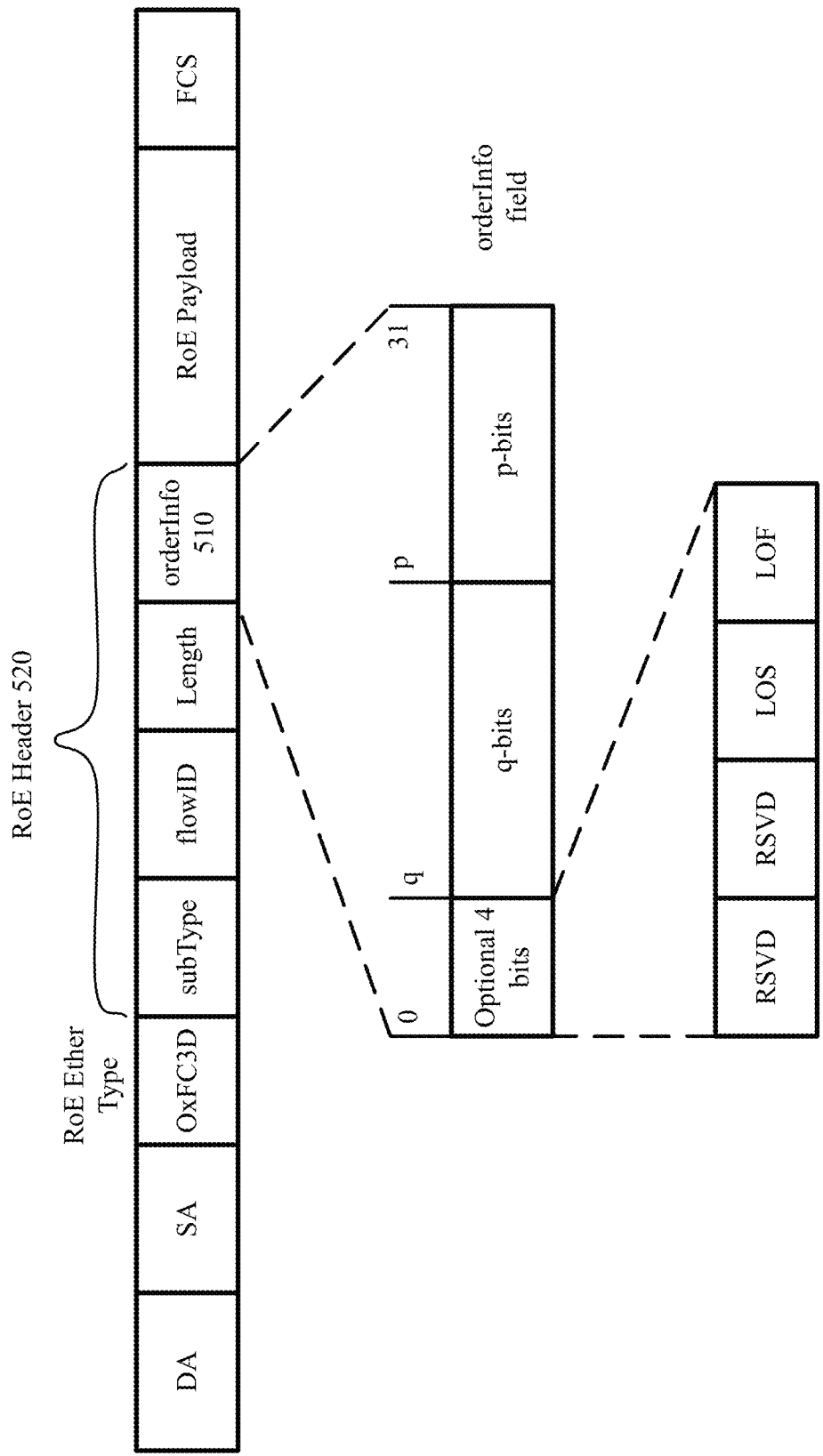
FIG. 5 is a diagram depicting use of optional reserved bits for fault communication between proxy nodes, in accordance with certain examples of the technology disclosed herein.

In block 340, the proxy slave 120 inserts LOS or LOF data into the RoE frame. The proxy slave 120 inserts the fault data into a location that will be readable by the proxy master 140 without obscuring or replacing useful data from the signal. In an example, the fault data is inserted in an unused or optional field in the frame header of the signal. FIG. 5 is a diagram depicting an example use of the optional reserved bits for fault communication between proxy nodes, in accordance with certain examples.

As shown in FIG. 5, an available RoE frame 500 may be used to communicate the signal from the proxy slave 120 to the proxy master 140. The proxy slave 120 uses the optional reserved bits from orderInfo field 510 in the RoE header 520. The IEEE 1914.3 standard does not specify the contents of these optional reserved bits. The 4 bits can be used for communicating the fault information between the proxy nodes 120, 140. In an example, the frame header 520 may include one bit for LOS, which would be set to 1 in case of LOS fault. The frame header 520 may include one bit for LOF, which would be set to 1 in case of LOF fault. The frame header 520 may leave the two remaining bits as reserved and set to 0.

Returning to FIG. 3, in block 350, the proxy slave 120 maintains communication to proxy master 140 for a preconfigured number of hyper-frames and communicates the LOS or LOF data to the proxy master 140. After inserting the fault in the frame header, an example of which is shown with respect to FIG. 5, the proxy slave 120 does not immediately cease communications or enter a resynchronization mode. Instead, the proxy slave 120 maintains the connection and communicates the signal for a preconfigured number of hyper-frames so that the proxy master 140 will have an opportunity to receive the fault. In an example, the proxy slave 120 maintains the connection for 10 hyper-frames, but any suitable number of hyper-frames, such as 5, 20, or 100, may be used based on the type of fault, the nodes in the system, the type of signal, or any other suitable factors.

In block 360, the proxy master 140 maintains communication with the proxy slave 120 and the RE 150 for a preconfigured number of hyper-frames and communicates the LOS or LOF data to the RE 150. The proxy master 140 does not immediately enter a resynchronization mode upon receiving the fault or recognizing a fault. Instead, the proxy master 140 maintains the connection, receives the communications from the primary slave 120, and communicates the signal for a preconfigured number of hyper-frames so that the RE 150 will have an opportunity to receive the fault. In an example, the proxy master 140 maintains the connection for 10 hyper-frames, but any suitable number of hyper-frames, such as 5, 20, or 100, may be used based on the type of fault, the nodes in the system, the type of signal, or any other suitable factors. The proxy master 140 reads the fault signal in the RoE frame header and communicates the fault to the RE 150.

In block 370, the REC 110, the proxy slave 120, the proxy master 140, and the RE 150 each enter the Layer 1 synchronization protocol. Because the REC 110 and RE 150 have recognized the fault, the devices each enter the Layer 1 synchronization. The proxy slave 120 and proxy master 140 have received the fault and recognized the need to enter the Layer 1 synchronization. Based on this stimulus, the proxy slave 120 and proxy master 140 stop communicating after the 10 hyper-frame hold and enter Layer 1 synchronization.

In block 380, the REC 110, the proxy slave 120, the proxy master 140, and the RE 150 reach a synchronized state and resume protocol communications. Because the devices all received the fault signal and entered the Layer 1 synchronization substantially at the same time, the devices reach synchronization faster than in a conventional system.

FIG. 4 is a block flow diagram depicting a method 400 to initiate a Layer 1 synchronization for proxy nodes in a fronthaul network after line code violations ("LCV"), in accordance with certain examples.

Block 410 is performed substantially the same as block 310 of FIG. 3 as described herein.

In block 415, the REC 110 experiences a number of line code violations ("LCV"). In structure agnostic mode without line coding mapping type, the proxy slave 120 receiving the CPRI stream removes the line coding bits while mapping the stream to the RoE frame. During this decoding, forward error correction and scrambling when supported are undone. In an example, if the source data is 8b/10b encoded, the 8-bit symbols out of 10-bits (due to encoding) present on the line will be mapped as 8 bits of data in the RoE frame. In another example, if the source data is 64b/66b encoded, the 64 bit symbol out of 66 bits (due to encoding) present on the line will be mapped as 64 bits of data in the RoE frame.

When the decoded data is communicated in RoE frames, the line code violations information is also lost. In an example, an 8 bit symbol is encoded in a 10-bit code before transmission. If the 10-bit code had the line coding violation due to link characteristics, after decoding to an 8 bit symbol, an 8 bit data is received. However the received data is not the same as what was originally transmitted by the original transmitter, and the line coding data is lost.

Additionally, when these 8 bits are packetized in the RoE frame and sent to the other RoE endpoint, such as the proxy master 140, the proxy master 140 will treat these 8 bits as actual data and will encode these to 10-bits encoded equivalent and communicate the signal in CPRI towards the CPRI end point, RE 150. When this happens, the far end CPRI end point, RE 150, will not recognize that this 10-bit and eventual decoded 8-bits are not same as what was communicated by the original CPRI transmitting end, REC 110. The RE 150 may communicate data that is different from the data communicated from the first device on an RF interface (if the device is RE 150), or pass on to higher layers (if the device is REC 110).

Similarly, the problem exists in a system with 64B/66B line coding. Due to the removal of line encoding (structure agnostic mode without line coding mapping type) in RoE mapping deployments in fronthaul, the CPRI end points, REC 110 and RE 150, will not recognize the presence of line code violations which results into similar issues for the actual CPRI end points. REC 110 and RE 150 will be unable to monitor link quality and communicate decisions to upper layers. The REC 110 and RE 150 will be unable to support the coding violation triggered LOS causing noncompliance with the CPRI v7.0 specification.

In block 420, the proxy slave 120 or the REC 110 compares the number of violations to a threshold. For example, for 8B/10B line coding, if at least sixteen 8B/10B line code violations exist in a single hyper-frame, then a fault is identified. In another example, for 64B/66B line coding, if at least four 64B/66B sync header code violations exist in a single hyper-frame, then a fault is identified. The threshold may be configured by an operator, by a server system, by an algorithm, or by any suitable party. The threshold may be set by a standards organization that publishes communication standards, such as for CPRI communications. The threshold may be based on the type of devices, networks, communication technologies, number of devices, distance between devices, or any other factors. The threshold may be stored at a central device location and accessed by the proxy slave 120 or other devices for comparison, or the threshold may be distributed to one or more devices, such as the proxy slave 120 and stored locally by those devices.

An LCV fault has the same effect as an LOS fault and the LCV fault is treated in a similar manner. A difference is that the LCV in a received stream acts as an LOS only if the LCVs are seen beyond a threshold in a single hyper-frame.

If the REC 110 detects the LCV, then the REC 110 communicates a notification of the fault to the proxy slave 120.

If the number of LCVs is lower than the threshold, the link is considered not to have an LCV, and no link fault is generated. If an LCV is not identified, then the method 400 follows the "NO" path to block 430. In block 430, the communications continue without resynchronization.

If an LCV fault is identified, the method 400 follows the "YES" path to block 440. In block 440, the proxy slave 120 inserts fault data into the RoE frame.

One method to insert the fault data into the RoE frame includes a list of fixed-sized extension headers in the RoE frame carrying the mapped CPRI stream. The list will be used to carry the byte or block position in the RoE frame for the original byte or 64 bit block where the line coding or sync header violation was detected, depending on line coding. The Proxy slave 120 on detecting the violations, will indicate the position of the byte/block using the extension header and add the position in the mapped RoE frame before sending to the Proxy master 140, where CPRI demapping will be carried out. The Proxy master 140 will refer to the line coding violation information from the RoE frame and error-propagate towards the RE 150 in place of data corresponding to these byte/blocks.

Figure 6:
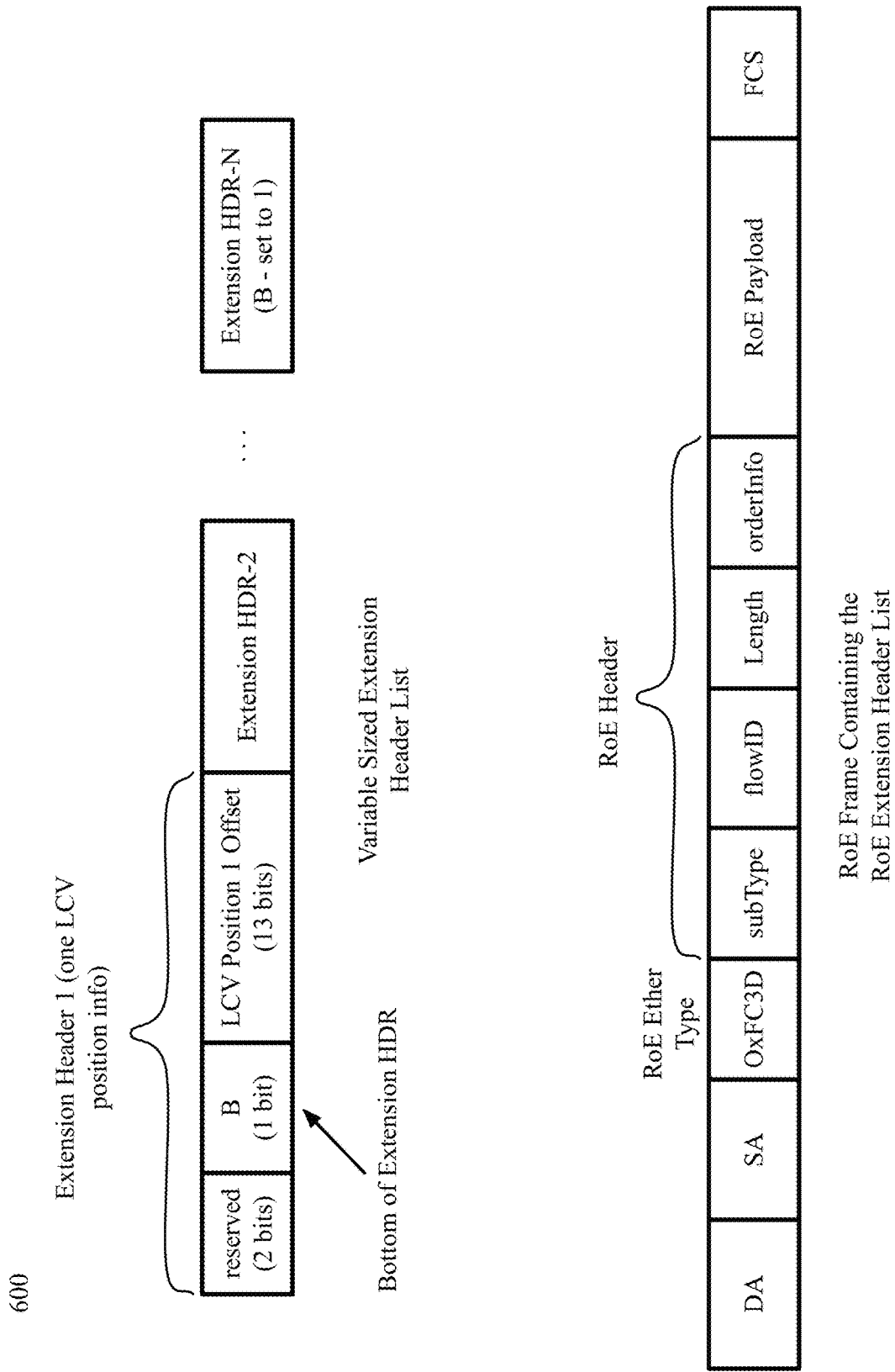
FIG. 6 is a diagram depicting a variable-sized extension header list and radio over Ethernet frame containing the radio over Ethernet extension header list, in accordance with certain examples of the technology disclosed herein.
Figure 7:
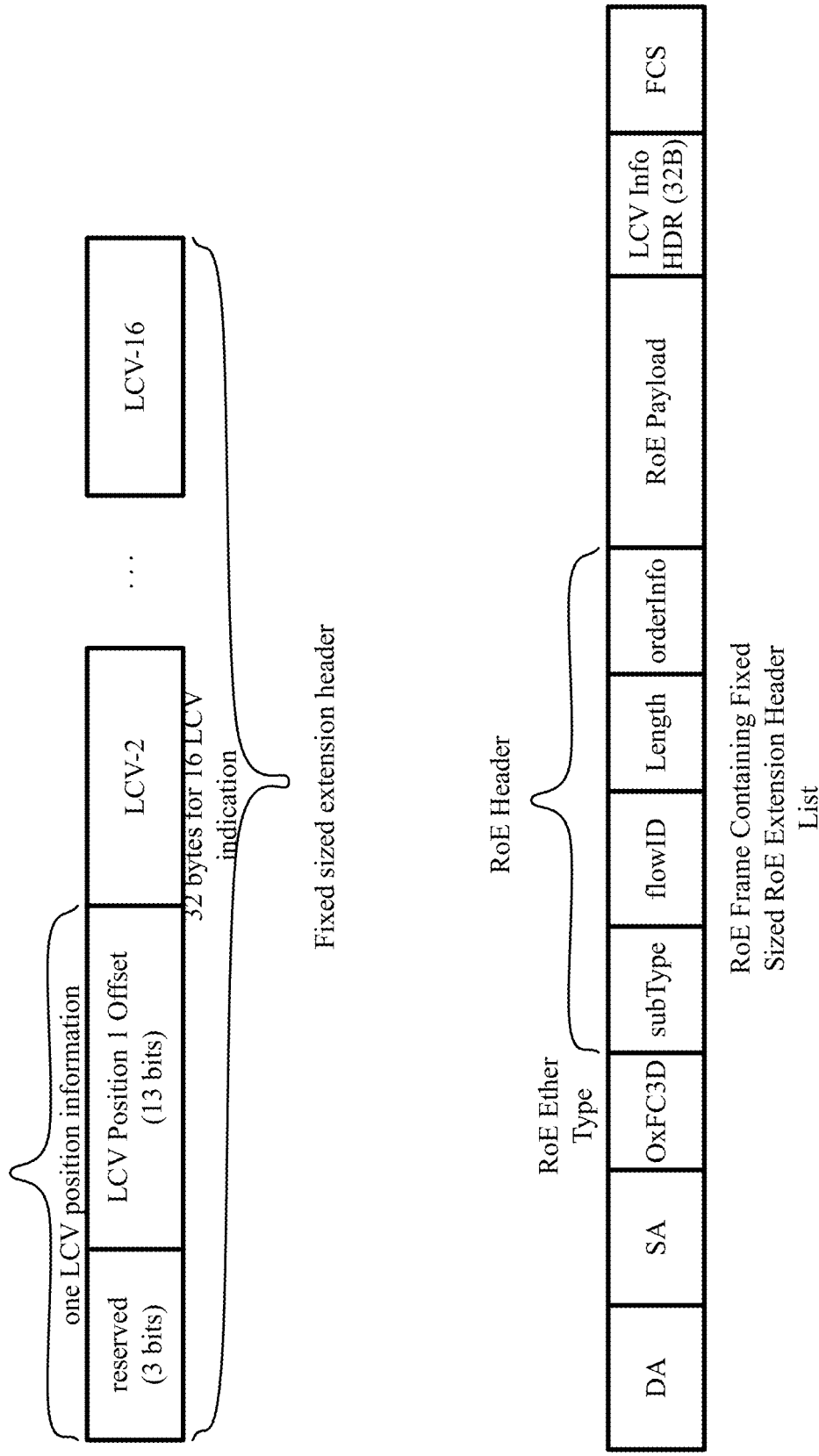
FIG. 7 is a diagram depicting a fixed-sized extension header and radio over Ethernet frame containing a fixed-sized radio over Ethernet extension header, in accordance with certain examples of the technology disclosed herein.

Multiple technologies exist to perform the fault communication. FIGS. 6 and 7 depict two example options.

FIG. 6 is a diagram depicting an example variable-sized extension header list, in accordance with certain examples. The presence of the extension header list can be indicated by one of the optional reserved bits in the orderInfo field. One extension header will be of fixed two bytes size, 13 bits for "LCV Position1 Offset", one bit to indicate the bottom of the extension header list or last of the extension header, and two bits as reserved for future use (set to zero).

For 8B/10B line coding, the maximum number of line coding violations that need to be communicated to the far end proxy node is 16. Beyond 16 line coding violations in a whole hyper-frame, the fault will be treated as LOS at the local end itself. Thirteen bits are needed to indicate the exact position of an LCV error byte position for a 4096 bytes sized packet. For 64B/66B line coding, less than 13 bits are needed to indicate the position of a 64 bit block for even an 8192 byte sized packet.

The list will be sent only when there is a violation detected in the CPRI stream being mapped to this RoE frame. The length field in the RoE header will include the size of the extension header list also when this list is present in the RoE frame. The position of the RoE extension header list can be between the RoE header and payload, or the position can also be appended at the end of the frame after the RoE payload and before FCS field. Other suitable positions may also be utilized in a similar manner.

FIG. 7 is a diagram depicting an example fixed-sized extension header and an example RoE frame containing the fixed-sized RoE extension header, in accordance with certain examples.

Two bytes are needed for indicating one violation in the RoE frame. Thirteen bits are needed for 4096-bytes sized packet (4 us) to indicate LCV byte position. Three bits are reserved (all zeros).

Line coding in 64B/66B has a maximum of 4 sync header code violations. Line coding 8B/10B has a maximum of 16 LCVs that need to be communicated to the Proxy master 140 in one RoE frame. Thus, a 32 byte sized fixed header (16 multiplied by 2 bytes) can be used in the RoE frame.

The LCV information is carried in the RoE frame only when a coding violation is detected to reduce the overhead due to this header. The presence of the extension header list can be indicated by one of the optional reserved bits in the orderInfo field. The position of the RoE extension header can be between the RoE header and the payload, or it can also be appended at the end of the frame after the RoE payload and before the FCS field.

In an alternate example, the method allows the Proxy slave 120 to communicate the position of the bytes/blocks for which coding/header violation has been detected. The communication allows the Proxy master 140 to error-propagate the same in the CPRI stream towards the RE 150 and the RE 150 can detect the coding/sync header violation just like a point-to-point CPRI link. By passing the violation information to the real CPRI endpoints, the coding/sync header violation handling becomes transparent to the fact that there is fronthaul network in between these nodes, REC 110 and RE 150. Once the line violations are detected beyond the allowed threshold at the REC 110 and RE 150, the REC 110 and RE 150 will raise an LOS alarm, which will be handled like an LOF or LOS fault discussed herein.

In an alternate example, as described in the IEEE 1914.3 specification, the experimental RoE subType is utilized. Using this subType, the structure of the RoE frame after the RoE common header can be defined to handle all the fault types. The variable-sized extension header list or fixed-sized header fields or a variant of the two can be used in the RoE frame for an Experimental RoE subType. For example, a fixed 32 bit header can be carried continuously in the RoE frames. This header can be used to carry the information about the line bit rate, CPRI alarms, RoE packet timestamp information, and some bits to indicate the presence of extra extension headers for LCV information.

Returning to FIG. 4, blocks 350, 360, 370, and 380 are performed substantially the same as blocks 350, 360, 370, and 380 of FIG. 3 described herein.

Other Examples

Figure 8:
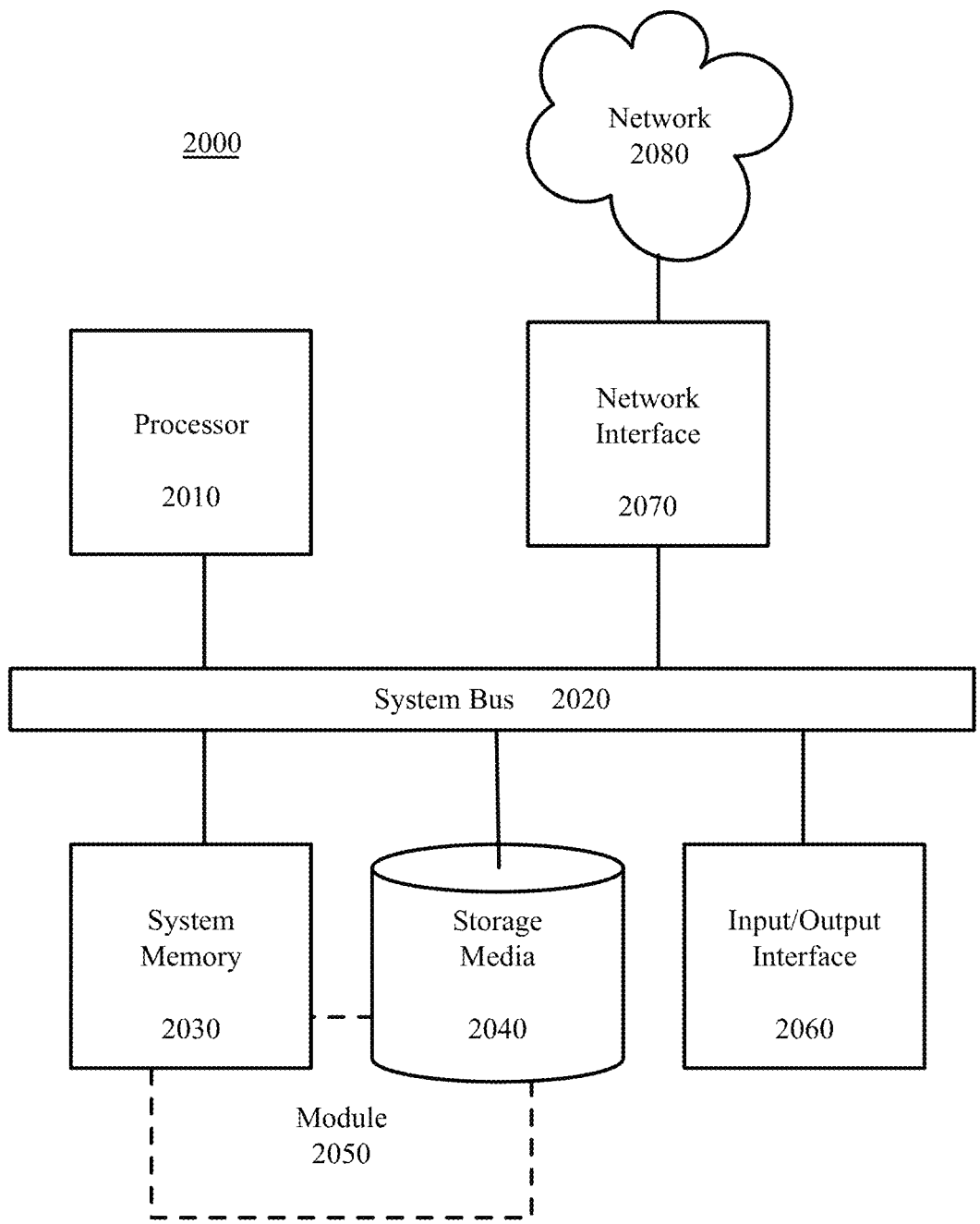
FIG. 8 is a block diagram depicting a computing machine and a module, in accordance with certain examples of the technology disclosed herein.

FIG. 8 depicts a computing machine 2000 and a module 2050 in accordance with certain examples. The computing machine 2000 may correspond to any of the various computers, servers, mobile devices, embedded systems, or computing systems presented herein.

The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
   by a first computing device in a fronthaul system:
   receiving a wireless signal from a radio device;
   mapping the wireless signal to a data frame;
   based on the mapping, recognizing a link fault in the wireless signal;
   based on recognizing the link fault, logging a fault alarm into a field of the data frame; and communicating the data frame with the fault alarm a configured number of times to a second computing device; and by the second computing device in the fronthaul system:

receiving the data frame from the first computing device;

reading the fault alarm in the field of the data frame;

mapping the data frame to a second wireless signal;

communicating the second wireless signal to a second radio device; and based on reading the fault alarm, initiating a resynchronization in conjunction with other nodes of the fronthaul system.

2. The method of claim 1, wherein the link fault is a loss of signal.

3. The method of claim 1, wherein the link fault is a loss of frame error.

4. The method of claim 1, wherein the field of the data frame with the fault alarm is an optional field of a radio over Ethernet header.

5. The method of claim 1, wherein the link fault is a line code violation.

6. The method of claim 5, wherein the field of the data frame with the fault alarm is a field within a variable-sized extension header in a radio over Ethernet header.

7. The method of claim 5, wherein the field of the data frame with the fault alarm is a field within a fixed-sized extension header in a radio over Ethernet header.

8. The method of claim 1, wherein the wireless signal is received via a common public radio interface with a line rate based on 8b/10b encoding.

9. The method of claim 8, further comprising propagating, by the second computing device, an 8-bit block to a receiving radio device.

10. The method of claim 1, wherein the link fault is a synchronization header violation and the wireless signal is received via a common public radio interface with a line rate based on 64b/66b encoding.

11. The method of claim 10, wherein the second computing device propagates a 64-bit block of data to a receiving radio device.

12. The method of claim 1, wherein the field of the data frame with the fault alarm is a field in an experimental radio over Ethernet subType header.

13. The method of claim 1, wherein the data frame is a hyperframe and the configured number of times is ten.

14. The method of claim 1, wherein the first computing device is a proxy slave node and the second computing device is a proxy master node.

15. The method of claim 1, wherein the first computing device is a proxy master node and the second computing device is a proxy slave node.

16. A computer program product, comprising:

a first non-transitory computer-readable medium having computer-readable program instructions embodied thereon that, when executed by a first processor of a first computing device in a fronthaul system, cause the first processor to:

receive a wireless signal from a radio device;

map the wireless signal to a data frame;

based on the mapping, recognize a link fault in the wireless signal;

based on recognizing the link fault, log a fault alarm into a field of the data frame; and communicate the data frame with the fault alarm a configured number of times to a second computing device; and a second non-transitory computer-readable medium having computer-readable program instructions embodied thereon that, when executed by a second processor of the second computing device in the fronthaul system, cause the second processor to:

receive the data frame from the first computing device;

read the fault alarm in the field of the data frame; map the data frame to a second wireless signal;

communicate the second wireless signal to a second radio device; and based on reading the fault alarm, initiate a resynchronization in conjunction with other nodes of the fronthaul system.

17. The computer program product of claim 16, wherein the link fault is a loss of signal.

18. The computer program product of claim 16, wherein the link fault is a loss of frame error.

19. A system, comprising:

a first storage device;

a first processor communicatively coupled to the first storage device, wherein the first processor executes application code instructions that are stored in the first storage device to cause the system to:

receive a wireless signal from a radio device;

map the wireless signal to a data frame;

based on the mapping, recognize a link fault in the wireless signal;

based on recognizing the link fault, log a fault alarm into a field of the data frame; and communicate the data frame with the fault alarm a configured number of times to a second computing device; and a second storage device; and a second processor communicatively coupled to the second storage device, wherein the second processor executes application code instructions that are stored in the second storage device to cause the system to:

receive the data frame communicated by the first processor;

read the fault alarm in the field of the data frame;

map the data frame to a second wireless signal;

communicate the second wireless signal to a second radio device; and based on reading the fault alarm, initiate a resynchronization in conjunction with other nodes of the fronthaul system.

20. The system of claim 19, wherein the link fault is a line code violation.

* * * * *